(12) United States Patent
Frenger et al.

(10) Patent No.: US 6,977,888 B1
(45) Date of Patent: Dec. 20, 2005

(54) HYBRID ARQ FOR PACKET DATA TRANSMISSION

(75) Inventors: Pål Frenger, Solna (SE); Erik Dahlman, Bromma (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 828 days.

(21) Appl. No.: 09/662,153

(22) Filed: Sep. 14, 2000

(51) Int. Cl.$^7$ ............................................ G01R 31/08
(52) U.S. Cl. ...................... 370/218; 370/236; 714/751; 714/758
(58) Field of Search ................................ 370/480, 216, 370/218, 236, 445, 335, 392; 714/751, 748, 714/750, 774, 746, 749, 800, 740, 798, 758, 714/752; 455/522

(56) References Cited

U.S. PATENT DOCUMENTS

| | | | |
|---|---|---|---|
| 4,584,685 A | | 4/1986 | Gajjar |
| 5,367,523 A | * | 11/1994 | Chang et al. ................ 370/235 |
| 5,719,883 A | * | 2/1998 | Ayanoglu .................... 714/751 |
| 5,828,677 A | * | 10/1998 | Sayeed et al. ............... 714/774 |
| 5,844,918 A | * | 12/1998 | Kato ........................... 714/751 |
| 5,946,320 A | * | 8/1999 | Decker ........................ 370/428 |
| 5,983,384 A | | 11/1999 | Ross |
| 6,243,358 B1 | * | 6/2001 | Monin ......................... 370/229 |
| 6,308,294 B1 | * | 10/2001 | Ghosh et al. ................ 714/751 |
| 6,370,669 B1 | * | 4/2002 | Eroz et al. ................... 714/774 |
| 6,434,114 B1 | * | 8/2002 | Jain et al. .................... 370/230 |
| 6,438,723 B1 | * | 8/2002 | Kalliojarvi .................. 714/751 |
| 6,496,481 B1 | * | 12/2002 | Wu et al. ..................... 370/242 |
| 6,615,382 B1 | * | 9/2003 | Kang et al. .................. 714/748 |
| 6,640,325 B1 | * | 10/2003 | Fischer ....................... 714/748 |

FOREIGN PATENT DOCUMENTS

| | | | |
|---|---|---|---|
| EP | 0 703 685 A | 3/1996 | |
| WO | 98/05140 A | 2/1998 | |
| WO | WO 9805140 A1 * | 2/1998 | ............. H04L 1/18 |
| WO | WO 98/48517 | 10/1998 | |

* cited by examiner

*Primary Examiner*—Bob A. Phunkulh
*Assistant Examiner*—Ian N. Moore
(74) *Attorney, Agent, or Firm*—Nixon & Vanderhye P.C.

(57) ABSTRACT

A hybrid ARQ scheme is used incremental data packet combining. In an example embodiment, the hybrid ARQ scheme with incremental data packet combining employs three feedback signaling commands: ACK, NACK, and LOST. Using these three feedback commands, the hybrid ARQ scheme with incremental data packet combining provides both robustness and good performance. This scheme is particularly advantageous in communication systems with unreliable communication channels, e.g., a fading radio channel, where forward error correction (FEC) codes are used and some of the code symbols are more important than other code symbols. Benefits include increased throughput and decreased delay of the packet data communication.

29 Claims, 8 Drawing Sheets

Packet Sender:

Packet Receiver:

HYBRID ARQ FOR PACKET DATA TRANSMISSION

FIELD OF THE INVENTION

The present invention relates to data communications, and more particularly, to reliable data delivery in a data communications system.

BACKGROUND AND SUMMARY

In digital data communications systems, it is common for data packets transmitted over a communications channel to be corrupted by errors, e.g., when communicating in hostile environments. Wireless radio communications are often conducted in an especially hostile environment. The radio channel is subjected to a barrage of corrupting factors including noise, rapidly changing communications channel characteristics, multi-path fading, and time dispersion which may cause intersymbol interference, and interference from adjacent channel communications.

There are numerous techniques that may be employed by a receiver to detect such errors. One example of an error detection technique is the well-known cyclic redundancy check (CRC). Other techniques used in packet data communications employ more advanced types of block codes or convolutional codes to accomplish both error detection and error correction. For both error detection and error correction, channel coding is applied which adds redundancy to the data. When the information is received over the communications channel, the received data is decoded using the redundancy to detect if the data has been corrupted by errors. The more redundancy built into a unit of data, the more likely errors can be accurately detected, and in some instances, corrected using a forward error correcting (FEC) scheme. In a pure FEC scheme, the flow of information is uni-directional, and the receiver does not send information back to the transmitter if a packet decoding error occurs.

In many communications systems, including wireless communications, it is desirable to have a reliable data delivery service that guarantees delivery of data units sent from one machine to another without duplication of data or data loss. Most such reliable data delivery protocols use a fundamental retransmission technique where the receiver of the data responds to the sender of the data with acknowledgments and/or negative acknowledgments. This technique is commonly known as automatic repeat request (ARQ) transaction processing. Coded data packets are transmitted from a sender to a receiver over a communications channel. Using the error detection bits (the redundancy) included in the coded data packet, each received data packet is processed by the receiver to determine if the data packet was received correctly or corrupted by errors. If the packet was correctly received, the receiver transmits an acknowledgment (ACK) signal back to the sender. If the receiver detects errors in the packet, it may also send an explicit negative acknowledgment (NACK) to the sender. When the NACK is received, the sender can retransmit the packet. In a pure ARQ system, the channel code is only used for error detection.

In hybrid ARQ (HARQ), features of a pure FEC scheme and a pure ARQ scheme are combined. Error correction and error detection functions are performed along with ACK/NACK feedback signaling. The channel code in a hybrid ARQ scheme may be used for both error correction and error detection. Alternatively, two separate codes can be used: one for error correction and one for error detection. A NACK signal is sent back to the transmitter if an error is detected after error correction. The erroneously received data packet in this first type of hybrid ARQ system is discarded.

A more efficient hybrid ARQ scheme is to save the erroneously received and negatively acknowledged data packet and then combine it in some way with the retransmission. Hybrid ARQ schemes that use packet combining are referred to as hybrid ARQ with combining. In a hybrid ARQ combining scheme, the "retransmission" may be an identical copy of the original packet. If the retransmission is identical to the original transmission, the individual symbols from multiple packets are combined to form a new packet consisting of more reliable symbols. Alternatively, the retransmission may use incremental redundancy (IR). In IR packet combining, additional parity bits are transmitted which makes the error correction code more powerful than, and generally superior to, identical packet combining.

There are systematic and non-systematic FEC channel encoders. A systematic encoder creates code-words by appending redundant bits, sometimes called parity bits, to a block of information bits. A non-systematic encoder maps a set of information bits into a completely different set of coded bits. One class of powerful systematic codes is turbo codes. A turbo encoder uses at least two recursive convolutional encoders separated by an interleaver. Information bits are sent directly to the first encoder, and via the interleaver to the second encoder. The turbo encoded code-words include the original information bits (i.e., the systematic bits) and additional parity bits from the first and second encoders. Because the systematic bits are used in both the first and second encoders, the systematic bits are more important to the decoder at the receiver than the parity bits. Indeed, if the systematic bits are lost, it may be impossible for the decoder to correctly decode the data packet even if a substantial number of parity bits are subsequently received.

Both systematic and non-systematic codes may be used as the FEC code in a hybrid ARQ with combining scheme. However, the use of IR packet combining may be more difficult to combine with a channel code in which different code bits have different importance to the encoder. The use of turbo codes and IR combining, for example, is problematic because when a new data packet is transmitted for the first time, all systematic bits in the first transmission are included which ensures good performance of the turbo decoder. In IR packet combining, any retransmissions contain parity bits but not the systematic bits. There is a problem if the receiver completely misses the original transmission or the original transmission is so corrupted that it is useless to the decoder. Because subsequent retransmissions contain additional parity bits without the systematic bits, the data packet may not be correctly decoded. If the channel is highly unreliable, for example a radio channel, this lost original packet scenario may occur relatively often, triggering a large number of unnecessary retransmissions and delays resulting in decreased efficiency and throughput.

It is an object of the present invention to increase throughput and decrease delay in a packet data communications system.

It is an object of the present invention to provide an improved and more flexible hybrid ARQ scheme.

It is an object of the present invention to overcome problems that occur when using a hybrid ARQ with packet combining scheme over an unreliable communication channel where some coded bits are more important to decoding than other coded bits.

In data packet transmissions between a transmitter and a receiver, a data packet includes a first type of bits and second type of bits. In the preferred embodiment, the first type of bits is more important to decoding the data packet at the receiver than the second type of bits. For example, the first type of bits may include actual information bits, or systematic bits (actual information bits plus other bits like tail bits), while the second type of bits may include parity bits. Without the actual information bits, it may be quite difficult or even impossible to accurately decode the data packet just using the parity bits. When a packet is negatively acknowledged by the receiver, the transmitter retransmits information that is to be used in a subsequent decoding operation at the receiver. Such a retransmission includes the second type of bits. In one embodiment of the invention, retransmission may also include the first type of bits as well. In another preferred embodiment, the second type of bits are retransmitted without the first type of bits.

If a data packet is detected as absent or otherwise substantially corrupted, a LOST signal is sent to the transmitter rather than a negative acknowledgment. In response to the LOST signal, the transmitter sends a first retransmission to the receiver including the first type data bits in the packet, and preferably, also second type bits as well. That first retransmission is decoded, and if not successful, a negative acknowledgment is sent to the transmitter. In response to the negative acknowledgment, the transmitter in a preferred embodiment sends a second retransmission that includes second type bits without first type bits. In another embodiment, both types of bits are retransmitted.

An example receiver includes transceiving circuitry for receiving a coded data packet transmitted over a communications channel. An initially-transmitted, coded data packet includes both first and second type bits. If the absence of an expected packet is detected, packet processing circuitry transmits a LOST signal to the transmitter. A retransmission of the expected packet, including at least the first type bits and possibly the second type bits as well, is decoded. In addition, if a received coded data packet is substantially corrupted, a LOST signal may also be sent to the transmitter. The packet processing circuitry includes a buffer for storing received packet information, a combiner for combining buffered information with retransmitted information, a decoder for decoding an output of the combiner, and a controller for controlling the operation of the buffer, combiner, and decoder. In a preferred, example embodiment, the buffer and combiner perform an incremental redundancy operation. If decoding of the first retransmission is not successful, but the received data is believed to be useful in subsequent decoding attempts, then a negative acknowledgment is sent to the transmitter. In response, a second retransmission is received, including a set of the second type of bits either with or without the first type of bits depending upon the implementation.

An example transmitter includes a signal processor for processing data to be transmitted and generating corresponding systematic bits and parity bits. A combiner selectively receives one or both of systematic and parity bits from the signal processor and generates a coded data packet. Transceiving circuitry transmits the coded data packet over the communications channel. A controller controls which bits are selected by the combiner to generate the coded data packet based on the feedback signal from the receiver. When a negative acknowledgment is received, parity bits corresponding to the systematic bits are retransmitted over the channel to the receiver. When (1) a LOST signal is received or (2) no acknowledgment or no negative acknowledgment is received for a coded data packet, the systematic bits and possibly some parity bits are transmitted over the communications channel to the receiver. In one example embodiment, the systematic bits are retransmitted along with a set of parity bits originally transmitted with the systematic bits. Alternatively, the systematic bits are retransmitted with a set of parity bits different from those originally transmitted. After the first retransmission in response to (1) or (2), if the transmitter receives a negative acknowledgment in response to the first retransmission, a set of parity bits associated with the systematic bits is retransmitted with or (preferably) without the systematic bits.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, the present invention may be implemented in any data communications system between any data transmitter and data receiver, e.g., see FIG. 8. One specific, non-limiting application of the invention is in a CDMA radio communications system, e.g., see FIG. 13.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
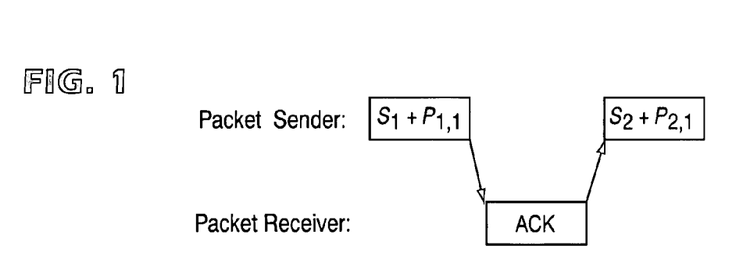
FIG. 1 is a diagram of an ARQ scheme showing successful transmission of one packet in the first attempt.

FIG. 1 shows an example of a successful data packet transmission in one attempt. In FIG. 1 and various subsequent figures (e.g., FIGS. 2–7), the boxes in the top row represent data packet transmission from the transmitter to the receiver and the boxes in the bottom row represent transmission of feedback information from the receiver back to the transmitter. In channel encoded communications described below, the bits that make up the n-th data packet include two groups or types denoted $S_n$ and $P_n$. The bits in the group $S_n$ are more important to the decoding process in the receiver than the bits in the group $P_n$. For example, the group $S_n$ may include all systematic bits from an encoder, and $P_n$ may include all parity bits from the same encoder. The group $P_n$ is further divided into sub-groups $P_{n,1}$, $P_{n,2}$, $P_{n,3}$, . . . representing parity bits that are transmitted in the first, the second, the third, etc. transmission attempts, respectively. The sub-groups $P_{n,k}$, k=1, 2, 3, etc. may be created, for example, by different puncturing of the set of all parity bits $P_n$. In FIG. 1, the first transmission of the first data packet includes the bits in the groups $S_1$ and $P_{1,1}$. After some delay introduced by the forward channel, the packet reaches the receiver which decodes it. If the error detection in the receiver determines that the data packet is correctly received, an ACK signal is sent back to the transmitter. After some delay introduced by the reverse channel, the transmitter receives the ACK signal, and the next data packet is transmitted consisting of the data bits in $S_2$ and $P_{2,1}$.

Figure 2:
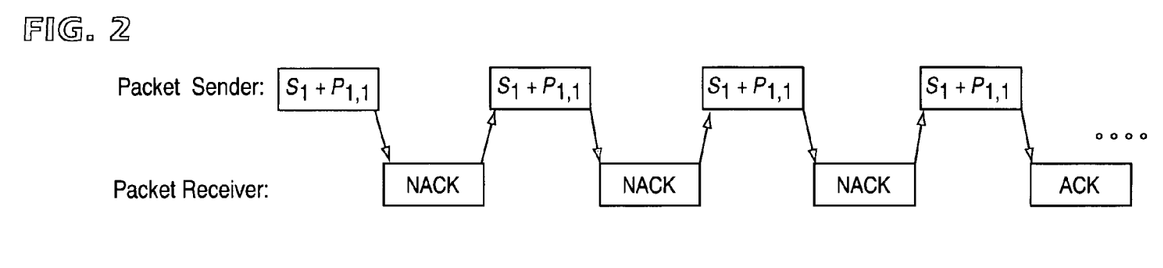
FIG. 2 is a diagram of a hybrid ARQ scheme with identical packet combining.

FIG. 2 shows the principle of hybrid ARQ with identical packet combining. Each time the transmitter receives a NACK signal from the receiver, it retransmits the same bits. Thus, if the original transmission include the bits in $S_1$ and $P_{1,1}$, then all retransmissions also include $S_1$ and $P_{1,1}$. The receiver combines the original transmission with all retransmissions in order to form a more reliable set of received symbols. Eventually, the packet is correctly decoded, and the receiver sends an ACK signal back to the transmitter.

Figure 3:
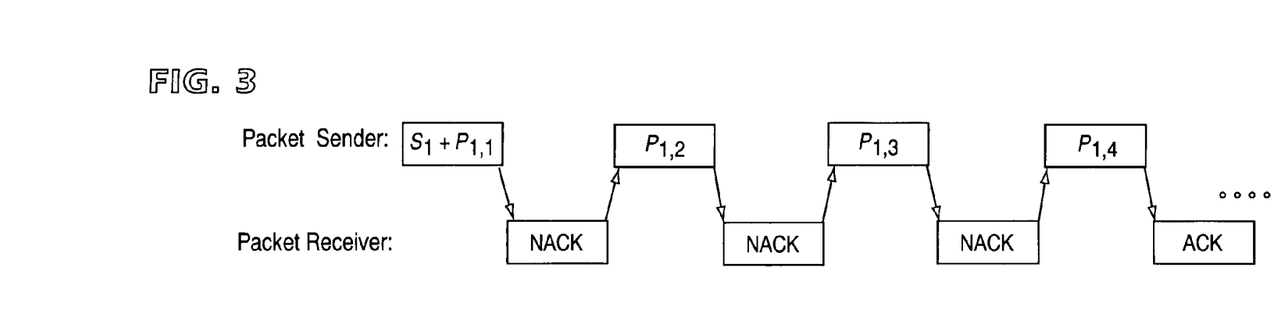
FIG. 3 shows a hybrid ARQ scheme with full IR packet combining.

FIG. 3 shows the principle of hybrid ARQ with incremental redundancy (IR) packet combining. Each time the transmitter receives a NACK signal from the receiver, the transmitter transmits a new set of bits denoted $P_{1,k}$, (k=2, 3, . . . ). For example, the bits $P_{1,2}$ in the second transmission consist only of additional parity bits used by the FEC decoder in the receiver. The FEC decoder in the receiver combines the systematic and parity bits transmitted in the first attempt ($S_1$ and $P_{1,1}$) and the parity bits transmitted in the first retransmission ($P_{1,2}$). Assuming the systematic bits are received, the decoder is more likely to accurately decode a packet using a larger number of parity bits, especially in hostile environments. In this example, the number of parity bits in $P_{1,2}$ is in general much larger than in $P_{1,1}$ because bits from the group $S_1$ are not transmitted when $P_{1,2}$ is transmitted. Eventually the packet is correctly decoded, and the receiver sends an ACK signal back to the transmitter.

Figure 4:
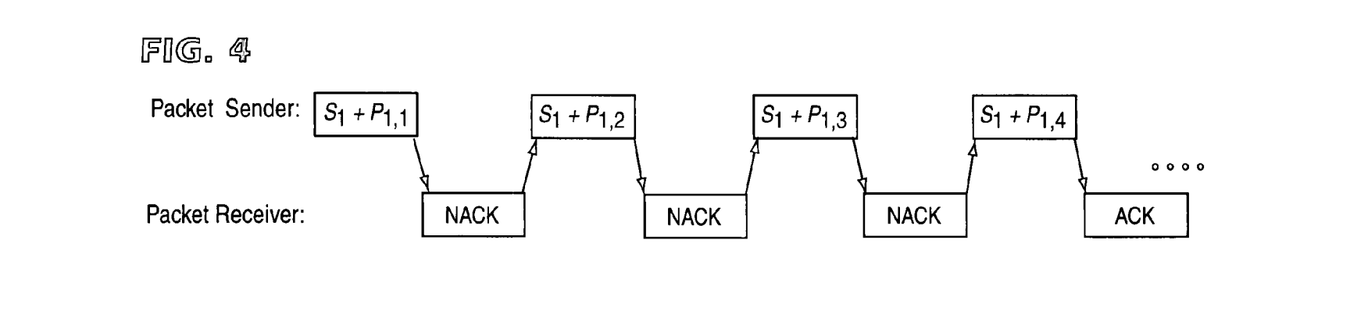
FIG. 4 shows a hybrid ARQ scheme with partial IR packet combining.

FIG. 4 shows a hybrid ARQ with partial incremental redundancy (IR) packet combining in accordance with one example, non-limiting embodiment of the invention. Here, the properties of both types of combining illustrated in FIG. 2 and FIG. 3 are used. Each time the transmitter receives an NACK signal from the receiver, it retransmits the same bits from $S_1$, but a new set of parity bits $P_{1,k}$ (k=2, 3, . . . ) is selected for each retransmission. The receiver combines the different transmissions of the bits in $S_1$ in order to make them more reliable, and the FEC decoder uses the bits in the different parity bit sets $P_{1,k}$ (k=2, 3, . . . ), to improve the error correction ability of the FEC decoder. Eventually the packet is correctly decoded, and the receiver sends an ACK signal back to the transmitter.

Figure 5:
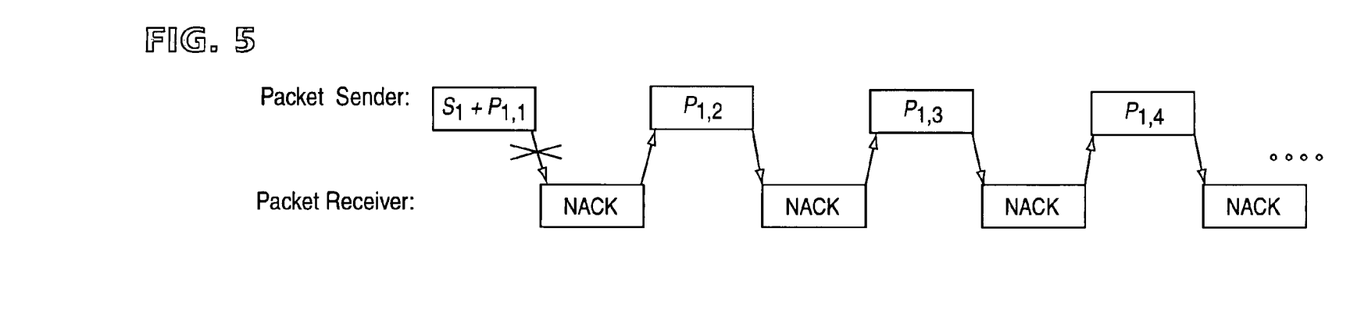
FIG. 5 shows a hybrid ARQ scheme with full IR packet combining where the original packet transmission is lost.

The hybrid ARQ packet combining systems depicted in FIGS. 2–4 have different advantages and disadvantages. For example, hybrid ARQ with identical packet combining requires less receiver buffer memory than the two IR combining schemes. When combining an original transmission with an identical retransmission in the receiver, the combined result may be stored in the same buffer area as the receiver used for storing the original transmission. Since the result after combining is more reliable than the old stored result from the original transmission, the old information is no longer needed. However, for IR combining schemes the retransmission contains new parity information which must be stored separately from the old information. One major disadvantage with the hybrid ARQ with identical packet combining system in FIG. 2 is a poorer performance compared to the two other schemes. The scheme depicted in FIG. 3 has potentially the best performance of the three schemes in terms of throughput and delay characteristics of the transmitted data packets. However, a drawback of the full IR scheme occurs when the original packet transmission fails to reach the receiver. This failed original packet transmission is illustrated in FIG. 5. Alternatively, the quality of the original transmission may be so poor that it is useless to the FEC decoder. In both cases, the important bits in the group $S_1$, (e.g., the systematic bits from an encoder), are not retransmitted. The retransmissions in FIG. 3 and FIG. 5 include bits only from the less important group of bits $P_1$, (e.g., the parity bits from a systematic encoder). A large number of retransmissions are needed because it may be very difficult to decode the data packet without having received at least some of the important bits in the group $S_1$.

Figure 6:
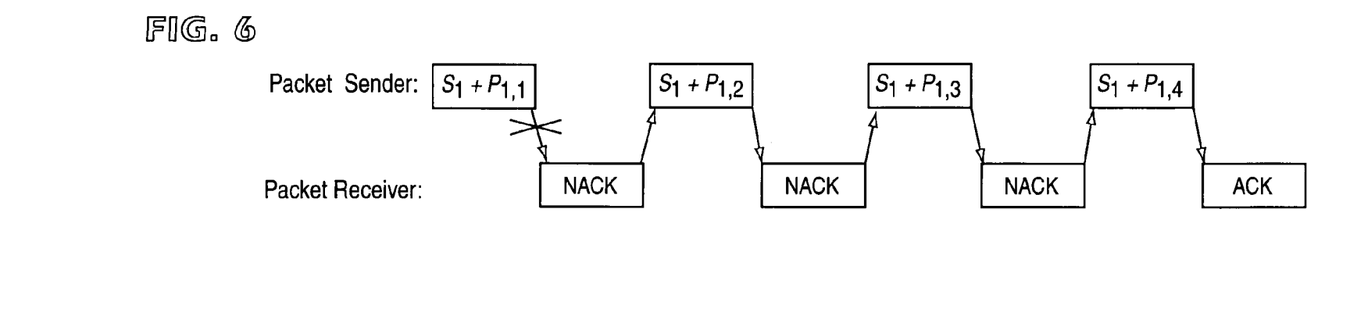
FIG. 6 shows a hybrid ARQ scheme with partial IR packet combining where a lost original packet transmission is recovered.

In contrast, the hybrid ARQ, partial IR scheme depicted in FIG. 4 solves this lost packet problem. As shown in FIG. 6, that hybrid ARQ, partial IR scheme is more robust than the hybrid ARQ full IR scheme because it overcomes the situation when the original transmission is lost or substantially corrupted. The retransmissions in this scheme include the bits in $S_1$, and for each retransmission, a new set of parity bits $P_{1,k}$ (k=2, 3, . . . ). Since the decoder receives the important bits, e.g., $S_1$, in the retransmission, the packet can be decoded. However, because each retransmission contains relatively few redundancy bits, the corresponding coding gain is reduced as compared to that of a full IR scheme where the retransmissions include only redundancy bits. Thus, performance and efficiency are traded off in the partial IR scheme for the robustness in handling retransmissions of lost packets.

Figure 7:
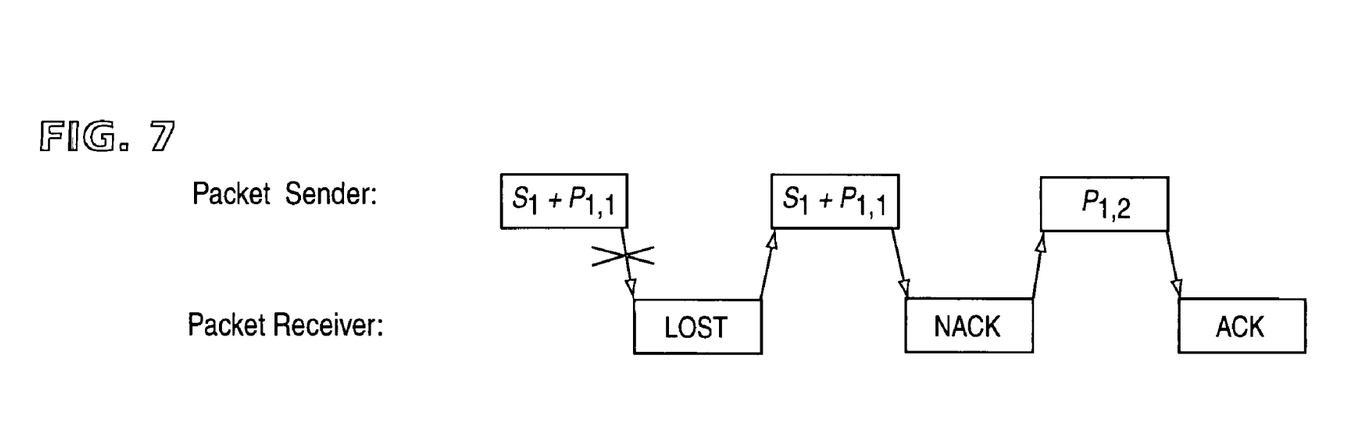
FIG. 7 shows a hybrid ARQ scheme with full IR packet combining where a lost original packet transmission is recovered.

Another solution to the substantially lost/corrupted original packet transmission problem is depicted in an example, non-limiting embodiment of the shown in FIG. 7. If the receiver does not receive a data packet or the received data packet is severely corrupted, the receiver sends a LOST signal, (i.e., not a NACK, nor an ACK signal), back to the transmitter. The LOST signal triggers the transmitter to include the more important bits in the group $S_1$ in the following retransmission, and preferably (though not necessarily), bits from the less important group $P_1$, e.g., $P_{1,1}$. On the other hand, if the receiver decides that the received data packet is useful, but errors are still detected in the decoder output, the receiver sends a NACK signal back to the transmitter. The NACK signal triggers the transmitter to send a retransmission including bits from the less important group $P_1$, e.g., $P_{1,2}$, without having to include the more important bits, e.g., $S_1$. In this way, each retransmission enjoys a greater coding gain than the solution in FIG. 4. Once the data packet is successfully decoded by the receiver, an ACK signal is sent back to the transmitter triggering transmission of the next data packet. One interpretation of the NACK and LOST signals is that the receiver transmits a NACK in order to ask for a retransmission containing mainly additional less important bits and a LOST signal to ask for a retransmission containing mainly the important bits.

In the embodiment of FIG. 7, the hybrid ARQ scheme which includes full IR packet combining uses three feedback responses: ACK, NACK, or LOST. If the receiver does not detect that the transmitter has sent a data packet or cannot decode it, an alternative response from the receiver may be complete silence rather than sending a LOST signal for simple ARQ schemes, like stop-and-wait ARQ. The receiver interprets a lack of response from the transmitter as a LOST signal, and this triggers the transmitter to retransmit the packet. This approach reduces the reverse link signaling from receiver to transmitter if only the ACK and NACK responses are employed. However, for more sophisticated ARQ schemes, e.g., go-back-N and selective repeat, sending a LOST signal for a particularly identified packet may be desirable or necessary.

The hybrid ARQ scheme with full IR data packet combining of FIG. 7 combines the advantages of identical packet combining and full IR data packet combining. By introducing a three level feedback signaling (ACK, NACK, or LOST), the scheme exploits the robust nature of identical data packet combining and the good performance resulting from greater coding gain provided by a full IR data packet combining system. The ultimate benefits are increased throughput and decreased delay of the packet data communication system. Increased throughput and decreased delay mean better communication services.

In the example embodiments of FIG. 4 and FIG. 6, the receiver does not always need three feedback responses (ACK/NACK/LOST). As long as the receiver can keep track of which less important bits are included in a retransmission, it is sufficient to use only two feedback responses (ACK/NACK). However, there are situations when using three feedback responses may still be beneficial even for the partial IR combining scheme. For example, if the receiver completely misses the original transmission or one of the retransmission, it might loose count on of the retransmissions. Thus, if the receiver detects that the set of less important bits in a retransmission does not correspond to what the receiver expected, it may send a LOST signal back to the transmitter which triggers the transmitter to start all over again with the original transmission. Alternatively, the receiver may not have enough buffer memory in the combiner buffer to store any additional less important bits. By sending a LOST signal to the transmitter, the following retransmission will contain only less important bits that has previously been transmitted, and which does not require any new buffer memory.

Figure 8:
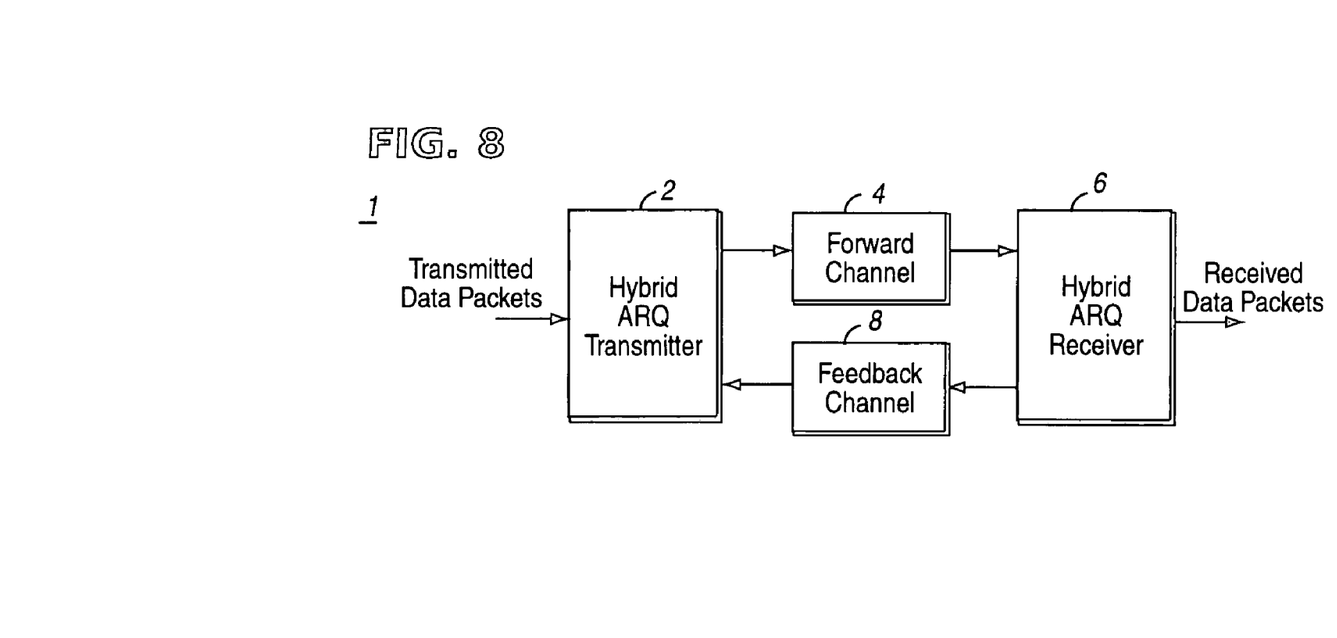
FIG. 8 is a diagram showing a communication system employing hybrid ARQ for packet data transmission in which the present invention may be employed.

The hybrid ARQ with packet combining schemes in accordance with FIGS. 4, 6 and 7 may each be implemented in a data communications system 1 as shown in FIG. 8. Transmitted data packets are received and processed by a hybrid ARQ transmitter 2. Channel encoded information, including a first group of bits important to decoding and a second group of bits less important to decoding are transmitted over a forward channel 4. A hybrid ARQ receiver 6 receives information over the forward channel 4 and includes error correction and detection functionality to process received data packets as well as detect the absence of a data packet. For satisfactorily decoded packets having no errors, the hybrid ARQ receiver 6 sends an acknowledgment signal (ACK) over a feedback channel 8 to the hybrid ARQ transmitter 2. Acknowledged data packets are also provided by the receiver to higher level applications in the receiver. For decoded data packets having detected errors, a negative acknowledgment (NACK) is transmitted back to the transmitter 2 over the feedback channel 8. If the scheme of FIG. 4 is employed, the transmitter 2 retransmits both the important bits, e.g., $S_1$, as well as a set of the less important bits, e.g., $P_{1,2}$. This process continues until the data packet is successfully decoded and acknowledged. If the scheme in FIG. 7 is employed, the hybrid ARQ transmitter 2 transmits a set of the less important bits, e.g., $P_{1,2}$, without sending the more important bits, e.g., $S_1$. This latter scheme is preferred because of its better performance.

However, if a data packet is detected as absent or is determined to be sufficiently corrupted so as to be uncorrectable (or practically so) by the receiver decoder, a LOST signal is sent by the receiver 6 through the feedback channel 8 to the hybrid ARQ transmitter. For simple stop-and-wait ARQ schemes, the failure to receive an ACK or a NACK within a particular time window after transmission may be interpreted by the transmitter as a LOST packet. A subsequent negative acknowledgment of that first retransmission results in a second retransmission of the same important bits as well as a set of the less important bits. This set of less important bits may be the same as in the first retransmission, e.g., $P_{1,2}$, or it may be a different set, e.g., $P_{1,3}$. A different set is preferred. In the solution of FIG. 7, if the first retransmission is negatively acknowledged, a second retransmission is sent to the receiver including a set of less important bits without including the more important bits. Again, the less important bits included in the second retransmission may be the same as those included in the first retransmission or they may be different (preferred).

Figure 9:
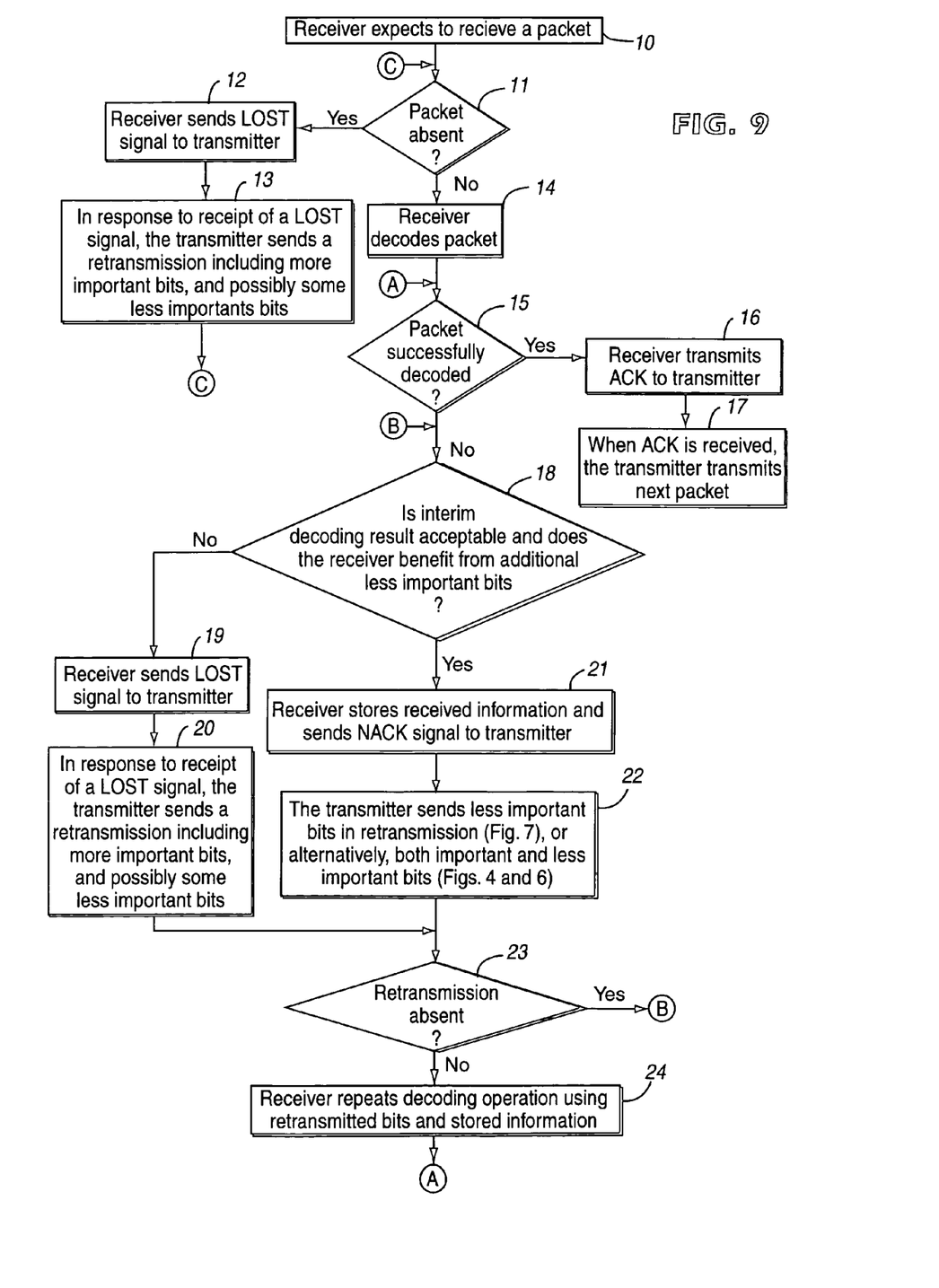
FIG. 9 is a flowchart diagram illustrating the procedure for one example implementation of the present invention.

Procedures that may be used in an example implementation of the present invention are now described in accordance with the flowchart diagram illustrated in FIG. 9. FIG. 9 illustrates the procedure when the receiver expects to receive a packet (block 10). The receiver decides if an expected data packet is absent or not (block 11). If the expected packet is absent, the receiver then sends a LOST signal to the transmitter (block 12). In response to receipt of the LOST signal, the transmitter sends a retransmission including more important bits, and possibly less important bits (block 13). The receiver then follows flag C back to block 11. Once the receiver detects in block 11 that an expected packet is not absent, the receiver decodes the packet (block 14). A decision is made whether a packet is successfully decoded (block 15). If so, the receiver sends an acknowledgment signal ACK to the transmitter (block 16). When the acknowledgment signal is received, the transmitter sends the next data packet (block 17).

On the other hand, if the packet is not successfully decoded in block 15, the receiver makes a decision on if the interim decoding results are acceptable and if the receiver can benefit from additional less important bits (block 18). One way of determining whether the interim decoding result is acceptable or otherwise usable in a packet combining error correction methodology is to simply compare the interim decoding result to a predetermined threshold. One reason for the receiver to decide that it can not benefit from additional less important bits, is if the combiner buffer (see FIG. 11 block 54) is full and there is no buffer memory left to store any additional less important bits.

If the answer in block 18 is YES, the receiver stores the received information and sends an NACK signal to the transmitter (block 21). In response to the NACK signal the transmitter sends less important bits in the retransmission (see FIG. 7), or alternatively, both more important and less important bits (see FIG. 4 and FIG. 6). The receiver then continues to block 23.

If the interim decoding result is determined in block 18 not to be acceptable, (e.g., the data is so corrupted that it cannot be practically corrected), or if the receiver decides that it can not benefit from additional less important bits (e.g. the combiner buffer is full), control proceeds to block 19 and the receiver sends a LOST signal to the transmitter. In response to receipt of a LOST signal, the transmitter sends a retransmission including the more important bits, and possibly some less important bits. The less important bits transmitted in response to a LOST signal may be the same as those transmitted in the original transmission (preferred) or they may be different. The receiver then continues to block 23.

In block 23 the receiver decides if the retransmission is absent or not. If the retransmission is absent the receiver follows flag B back to block 18. If the retransmission is not absent, the receiver repeats the decoding operation using retransmitted bits and stored information (block 24). After this decoding operation the receiver follows flag A back to block 15.

As described above, in the system of FIG. 8, the transmitter may respond in different ways when a LOST signal is received. In one preferred approach, the transmitter starts all over and retransmits both the originally transmitted important and less important bits, e.g., $S_1$ and $P_{1,1}$, whenever a lost signal is received (preferred). Alternatively, the retransmission may include the important bits $S_1$ together with a new set of less important bits not previously transmitted, e.g. $P_{1,2}$ when a LOST signal is received. Still further, it is also possible to send a combination of new and previously transmitted bits from the set of less important bits P when a LOST signal is received. The advantage of sending a new set of less important bits is better performance compared to sending the original less important bits. The advantage of starting all over again and retransmit the same bits as in the first attempt is that this ensures that the received information in the retransmission will fit in to the combiner buffer in the receiver.

Figure 10:
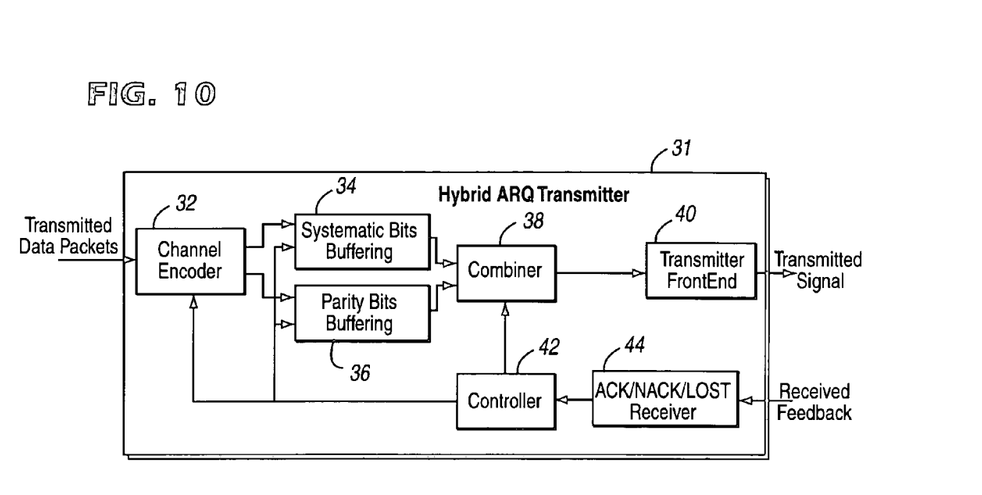
FIG. 10 is a more detailed function block diagram of an example hybrid ARQ transmitter.
Figure 11:
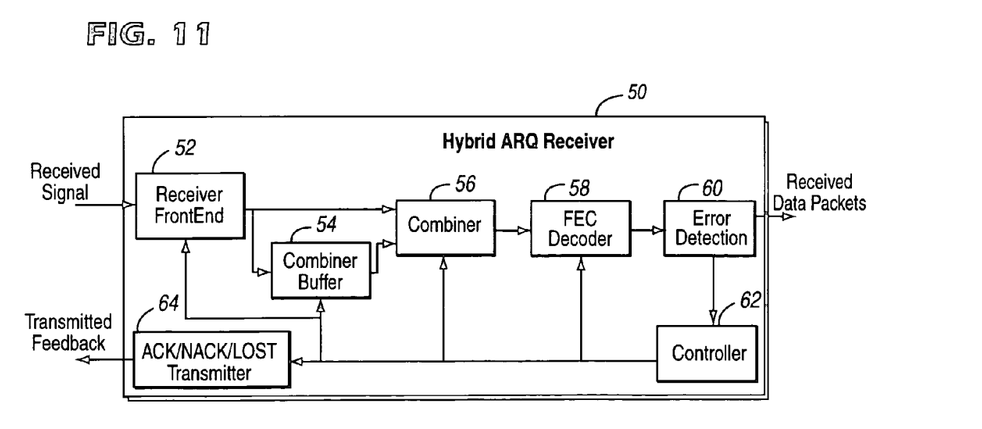
FIG. 11 is a more detailed function block diagram of an example hybrid ARQ receiver.

FIGS. 10 and 11, respectively, show in function block format a hybrid ARQ transmitter 31 and a hybrid ARQ receiver 50 that may be used in an example implementation of the present invention. The hybrid ARQ transmitter 31 in FIG. 10 includes a channel encoder 32 which performs channel encoding functions including coding original data with forward error correction and error detection bits. The output of the channel encoder 32 includes important bits like systematic bits and less important bits like parity bits. Systematic bits are more important, for example, to the decoding operation in the receiver than the parity bits. The controller 42 controls the operation of the channel encoder 32, the buffers 34 and 36, and the combiner 38. Depending upon the received feedback signal (ACK/NACK/LOST) provided by receiver 44 to controller 42, bits from one or both of buffers 34 and 36 are combined in combiner 38 and provided to the transmitter front end 40 for transmission over the communications channel. As described above, depending upon the received feedback signal and the particular embodiment employed, systematic bits may or may not be combined in the retransmission, and certain ones of the parity bits may be selected and combined in the retransmission.

The hybrid ARQ receiver 50 in FIG. 11 includes a receiver front end 52 which receives the signal transmitted over the communications channel. The received signal information is actually stored in a combiner buffer 54 and also provided to a combiner 56. The output of the combiner 56 is processed in a forward error correction (FEC) decoder 58. The decoded output is processed in error detection block 60 to detect errors in the decoded output. If no errors are detected, the data packet is output for further processing by higher level applications in the receiver. For accurately decoded packets, the controller 62 sends an ACK signal by way of transmitter 64 to the transmitter 31. On the other hand, if errors are detected in the decoder output, the controller 62 transmits a NACK signal via the transmitter 64 requesting retransmission. Still further, the controller 62 may also determine when a packet has not been received within a particular time window. Packet identifiers are typically included in data packets to specify the sequence as well as identity of a particular packet. Using this identifying information, the receiver can detect if a specific packet has not been received and send a LOST signal to transmitter 31. This identifying sequence information is also used by the combiner 56 to perform incremental redundancy combining of systematic and parity bits. Moreover, if the controller receives a signal from the error detection block 60 which indicates that there are too many errors output by the FEC decoder 58, making error correction either too difficult or improbable, the controller 62 sends a LOST signal from its transmitter 64.

The following is an example of how the bits in $S_1$ and $P_{1,1}$ may be incrementally combined with $P_{1,2}$. A rate R=⅕ turbo encoder is assumed for error correction. (A turbo encoder is described in conjunction with FIG. 14). The turbo encoder calculates four streams of parity bits, i.e. four bits for every systematic bit. Thus, if the data packet to be transmitted consists of N bits, we will obtain 4N parity bits from the channel encoder 32. In the first transmission attempt it might be unnecessary to transmit all 5N bits, since transmitting this many bits all the time will increase the required bandwidth of the communication system. Instead, only the N systematic bits in $S_1$ and N of the parity bits (i.e., $P_{1,1}$) are sent in the first transmission attempt. For example, $P_{1,1}$ may include odd numbered parity bits from the first stream and even numbered bits from the third stream of parity bits. Thus, in this example, bits from the second or fourth streams of parity bits are not sent in the first transmission attempt.

If a NACK signal is received, 2N new parity bits $P_{1,2}$ are sent. For the second transmission attempt $P_{1,2}$ may include all even numbered bits from the first, odd numbered bits from the second, odd numbered bits from the third, and even numbered parity bits from the fourth streams of parity bits. The FEC decoder 58 in the receiver has now obtained all bits from the first and third streams and half of the bits from the second and fourth streams, respectively. The bits in $S_1$, $P_{1,1}$, and $P_{1,2}$ are arranged in the correct order by the combiner 56 and the bits that are still missing are ignored, (i.e., the even numbered bits from the second stream of parity bits and the odd numbered bits from the fourth). After the second transmission attempt, the decoder 58 has a much more powerful channel code to decode, and this significantly improves the probability of correct decoding.

Figure 12:
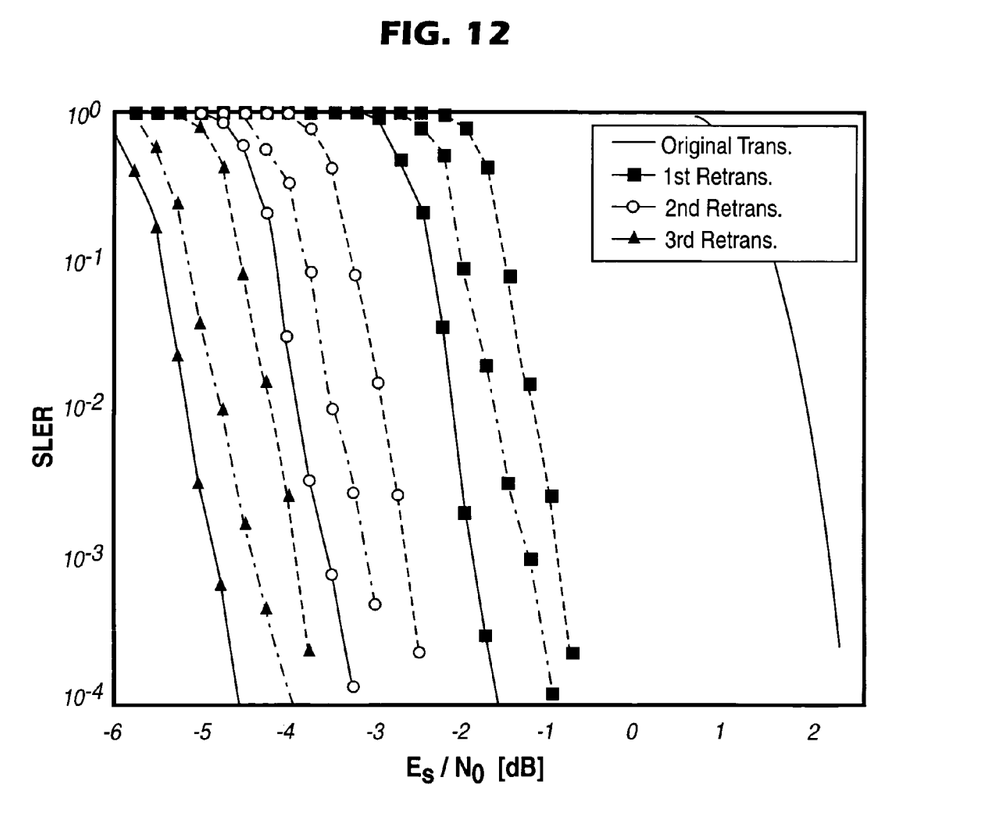
FIG. 12 is a graph illustrating the performance of various hybrid ARQ schemes.

The different hybrid ARQ schemes are compared by using an example simulation, the results of which are shown in FIG. 12. The following are the simulation assumptions. The FEC encoder is a standard rate ½ turbo encoder with constraint length 3. The bits from the turbo encoder are modulated by a QPSK modulator and transmitted over an AWGN channel. The turbo encoder uses a block-size of 960 bits and the turbo decoder uses 4 iterations. FIG. 12 shows the simulated slot error rate (SLER) as function of $E_S/N_0$ in dB, where $E_S$ is defined as the average energy per modulation symbol, and $N_0$ is the one-sided power spectral density of the white noise on the channel. The slot error rates presented in FIG. 12 are interpreted as the probability that the data packet is not correctly communicated after one, two, three, or four transmission attempts, respectively. Slot error rate performance for the original transmission of each data packet is shown using a solid line with no markers. Slot error rate performances after one, two, and three retransmissions are shown with black squares, white circles, and black triangles, respectively. Dashed lines with markers represent the identical packet combining system depicted in FIG. 2. Dash-dotted lines with markers represent the partial IR packet data combining system depicted in FIG. 4. Solid lines with markers represent the full IR packet data combining system depicted in FIG. 3. The performance of all schemes improves as the number of transmission attempts increase. The difference between identical packet combining and partial IR combining is about 0.5 dB. The full IR combining scheme is 0.5 dB better than the partial IR combining scheme. In this example simulation, the full IR combining scheme outperforms the simple packet combining scheme by about 1 dB which is why the hybrid ARQ with full IR combining in FIG. 7 is preferred over the hybrid ARQ with partial IR combining in FIGS. 4/6.

Using the present invention, it is possible to implement an identical, a partial IR, and a full IR combining scheme in the same hybrid ARQ protocol. If the receiver is only capable of handling identical packet combining, then it can send LOST signals instead of NACK signals so that the transmitter retransmits the original data until the receiver can decode it correctly. Once the data packet is correctly decoded, the receiver transmits an ACK signal. A more advanced receiver can take advantage of the improved performance of partial or fall IR hybrid ARQ by transmitting NACK signals to trigger the transmitter to send more and varied redundant information. Another possible use of the invention is to allow the receiver to use full IR combining until it runs out of memory in the receiver combiner buffer. Once the receiver combiner buffer is full the receiver can fall back to identical packet combining. This also allows for the receiver to use full JR combining for small data packets and identical packet combining for larger data packets. Thus the receiver can make a trade off between the cost of combiner buffer memory and performance.

Figure 13:
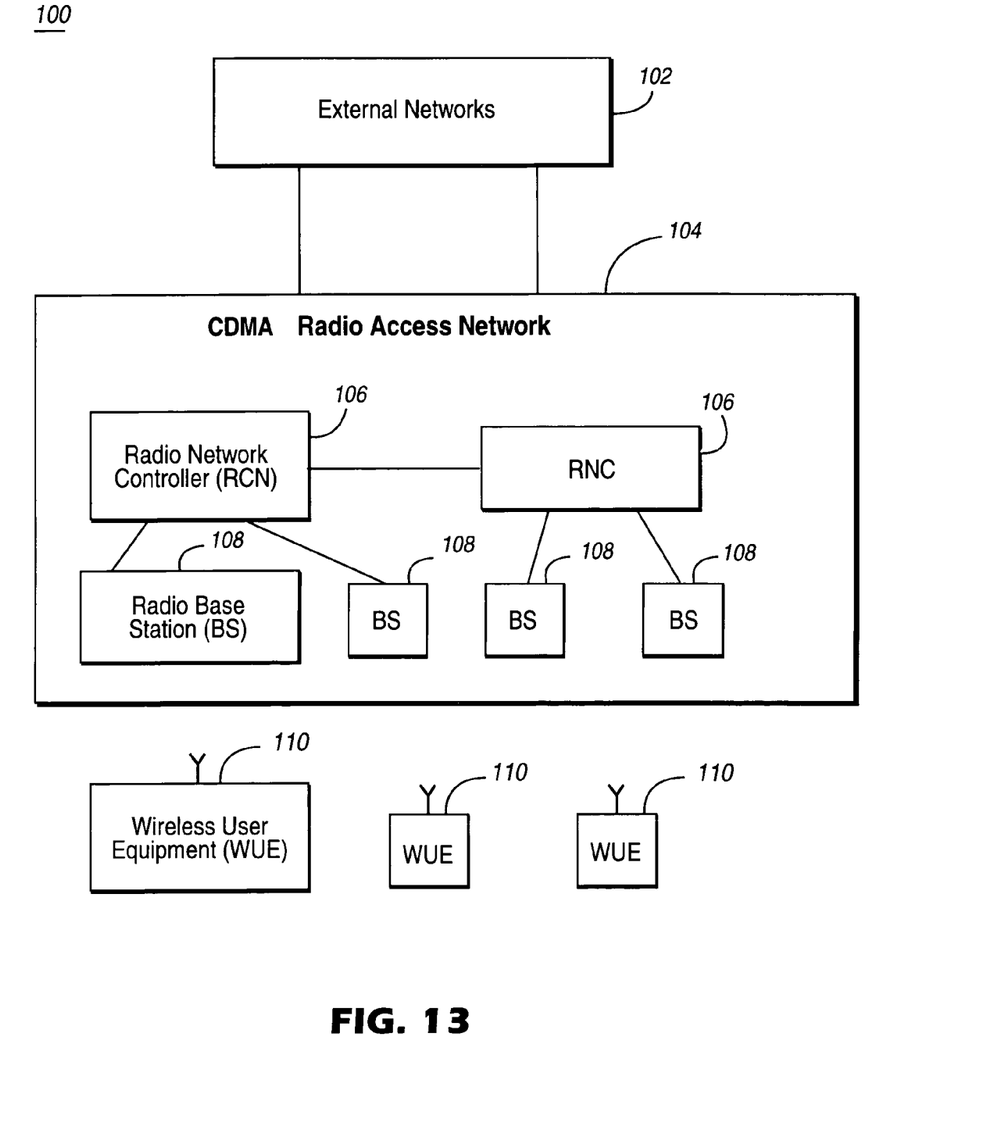
FIG. 13 illustrates a radio communications system in which the present invention may be advantageously employed.

One type of system in which this can be an advantage is a cellular radio communication system in which the transmitter is the base station and the receiver is the mobile unit or vice versa. A more advanced mobile unit capable of partial or full IR packet data combining will then achieve higher throughput than a simpler (and less expensive) mobile unit. FIG. 13 illustrates an example CDMA communications system 100. External networks 102, which may include circuit-switched type networks as well as packet-switched type networks, connected to a CDMA radio access network 104 that includes one or more radio network controllers (RNCs) 106. Each RNC 106 is connected to a plurality of radio base stations (BSs) 108 and to other RNCs in the radio access network 104. Radio communications between one or more base stations 108 and a wireless user equipment (WUE) 110 are by way of a radio interface. A mobile radio terminal is an example of a wireless user equipment 110. Radio access in this non-limiting example is based on CDMA with individual radio channels being distinguished using spreading codes. CDMA provides wide radio bandwidth for multimedia services including packet data applications with high data rate/bandwidth requirements. One scenario in which high speed data may need to be transmitted downlink from the radio access network 104 over the radio interface to a wireless user equipment 110 is when the wireless user equipment 110 requests information from a computer attached to the Internet, e.g., a website.

Each WUE and BS includes a channel encoder and decoder. A channel encoder maps a block (or a sequence) of input information bits into a block (or a sequence) of coded bits. In this WCDMA non-limiting application of the present invention, the channel encoder and decoder are preferably a turbo encoder and decoder. A turbo encoder is described in further detail below.

Figure 14:
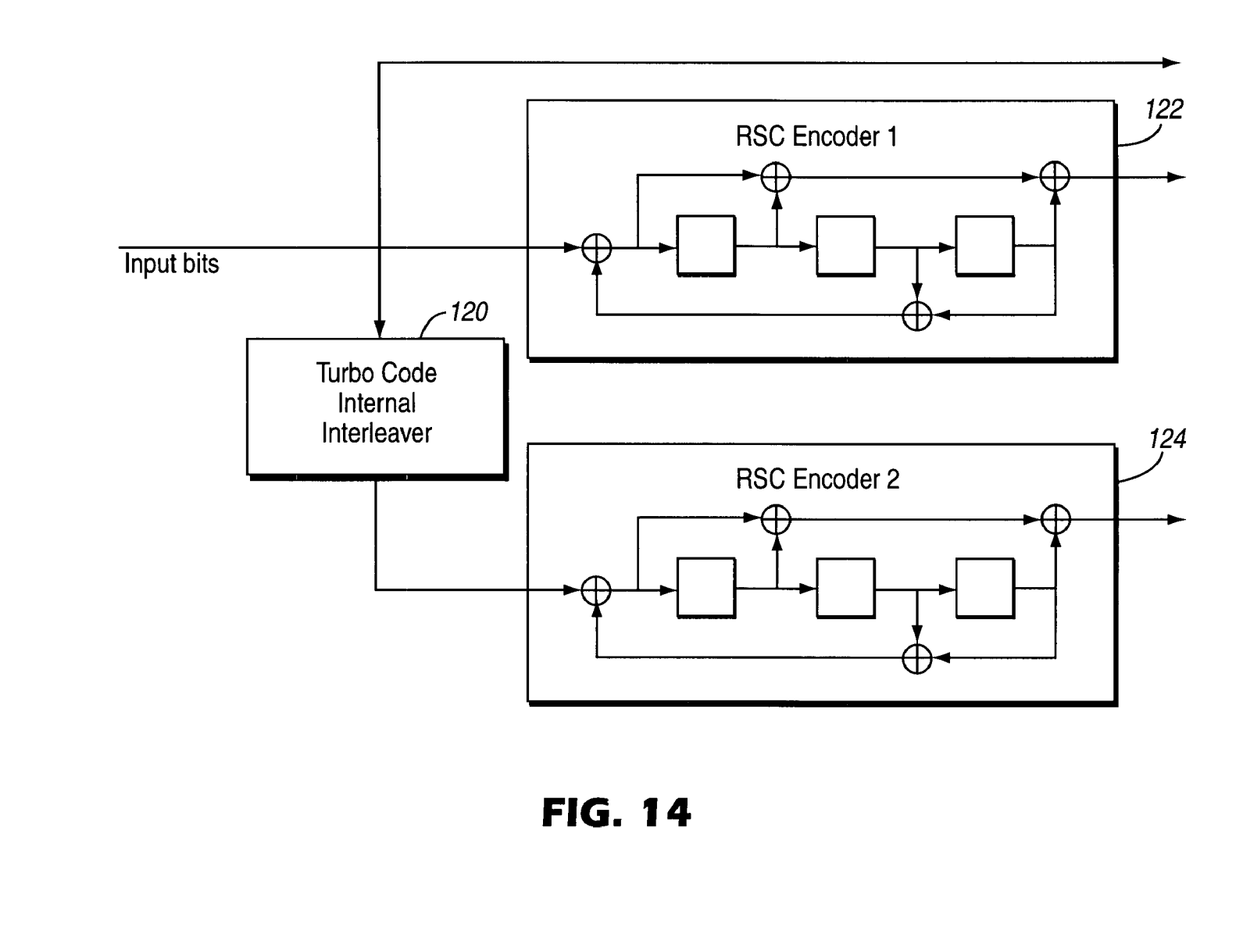
FIG. 14 illustrates in block format a turbo encoder.

FIG. 14 illustrates an example turbo encoder of rate R=⅓ including two Recursive Systematic Convolutional (RSC) encoders. The RSC encoders are called convolutional because the linear shift register structure resembles a standard digital linear filter, and linear filters convolve the input with the filter impulse response. The term "recursive" relates to the fact that there is a feedback loop present in the RSC encoders. The two RSC encoders are concatenated in parallel and are separated by an interleaver. The interleaver takes one block of input bits and re-orders them in a random-like manner. The input bits are forwarded directly to the first RSC encoder and via the interleaver to the second RSC encoder. A turbo encoder operates on a block of input bits, $N_{tot}$, and also the size of the interleaver equals $N_{tot}$.

The encoder in FIG. 14 is not so much "turbo" as is the corresponding decoder in the receiver. The received systematic bits and the received parity bits corresponding to the first RCS encoder are used in a decoder that only takes RSC-1 into account. From this decoding process, some knowledge about the transmitted information bits is acquired. This so-called "soft information" is used to decode an interleaved version of the received systematic bits and the received parity bits from RSC-2. After this decode operation, more is known about what information was transmitted. The decoding process is repeated, but this time using what was learned about the information bits during the previous iteration of the decoding process. The decoding process may be repeated, and the performance increases a little bit in every new iteration. Hence, the use of the term "turbo." Desirable qualities of turbo encoders include: (1) the code words look like random code words to the channel, and (2) it is simple to construct very long code words. The structure imposed on the code words by the turbo encoder is enough to make the decoding process practical, but not so much that the desirable random-like properties are lost.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. While systematic bits and parity bits are given as examples of important and less important bits, other groups and types of bits may be identified as important and less important. Accordingly, it is intended that the invention be limited only by the scope of the claims appended hereto.

What is claimed is:

1. For use in data packet transmissions between a transmitter and a receiver where a data packet includes a first type of bits corresponding to actual information bits and a second type of bits corresponding to parity bits, the information bits being more important to decoding than the parity bits, a method comprising:
   detecting an error in a received data packet;
   sending a negative acknowledgment signal to the transmitter to trigger a first type of retransmission of the parity bits to be used in a subsequent decoding operation at the receiver;
   detecting an absence of a lost data packet;
   sending a lost signal message to the transmitter rather than the negative acknowledgment signal, the lost signal message indicating that the lost data packet was detected as not received;
   in response to the sending of the lost signal message, receiving from the transmitter a second different type of retransmission of the information bits of the lost data packet;
   decoding the second different type retransmission.

2. The method in claim 1, wherein the different second type retransmission also includes a first set of the parity bits of the lost data packet.

3. The method in claim 2, further comprising:
   if the decoding of the second different type retransmission is not successful, sending the negative acknowledgment signal to the transmitter;
   receiving from the transmitter a third type of retransmission including a second set of the parity bits different from the first set;
   decoding the data packet using information from the second and third type retransmissions.

4. The method in claim 3, wherein the third type retransmission does not include the information bits.

5. The method in claim 3, wherein the third type retransmission includes the information bits and the second set of the parity bits.

6. The method in claim 1, wherein the lost data packet is detected as absent by determining that a packet with a particular identifier expected to be received was not received in an expected time period.

7. The method in claim 1, wherein the lost data packet is detected as absent by comparing a decoding result for the packet with a threshold.

8. A method of processing received encoded data packets, each encoded data packet including a first group of bits corresponding to actual information bits and a second group of bits corresponding to parity bits, where the information bits are more important to decoding the data packet than the parity bits, comprising:
   decoding a received packet to produce an interim decoding result;
   determining if the interim decoding result is above a threshold;
   if the interim decoding result indicates an error in the received packet and the interim decoding result is at or above the threshold, sending a negative acknowledgement signal to trigger a first type of retransmission of the parity bits;
   if the interim decoding result is not above the threshold, sending a lost signal message rather than the negative acknowledgement signal to trigger a second type of retransmission of the information bits of the data packet, the second type of retransmission being different from the first type of retransmission, the lost signal message indicating that the data packet was detected as absent;
   receiving a second type of retransmission of the information bits of the data packet;
   decoding the second type retransmission.

9. The method in claim 8, wherein the second type retransmission also includes a first set of the parity bits of the data packet.

10. The method in claim 8, further comprising:
    if the decoding of the second retransmission is not successful, sending the negative acknowledgment to the transmitter;
    receiving from the transmitter a third type retransmission including a second set of the parity bits different from the first set;
    decoding the data packet using information from the second and third type retransmissions.

11. The method in claim 10, wherein the third type retransmission only includes the second set of parity bits.

12. The method in claim 10, wherein the third type transmission retransmission includes the information bits and the second set of the parity bits.

13. Apparatus for use in a transmitter which transmits data over a communications channel, comprising:
    a signal processor configured to process data and generate corresponding systematic information bits and parity bits;
    a combiner configured to selectively receive systematic information bits and parity bits and generate a coded data packet;
    transceiving circuitry configured to transmit coded data packets over the communications channel;
    a controller configured to control which bits are selected by the combiner to generate the coded data packet based on feedback from a receiver;
    wherein when a negative acknowledgment signal is received, the controller is configured to send a first type of retransmission with parity bits over the communications channel to the receiver;
    wherein when a lost signal message is received, the lost signal message indicating that the data packet was detected as absent, the controller is configured to send a second type of retransmission with the systematic information bits over the communications channel to the receiver; and
    wherein the first type of retransmission is different from the second type of retransmission.

14. The apparatus in claim 13, wherein the signal processor and combiner is implemented using a turbo encoder.

15. The apparatus in claim 14, wherein the communications channel is a radio channel.

16. The apparatus in claim 13, wherein when the lost signal message is received or no acknowledgment signal or negative acknowledgment signal is received, the systematic information bits are retransmitted over the communications channel to the receiver along with parity bits originally transmitted with the systematic information bits.

17. The apparatus in claim 13, wherein when the lost signal is received or no acknowledgment signal or negative acknowledgment signal is received, the systematic information bits are retransmitted over the communications channel to the receiver along with parity bits different from the parity bits originally transmitted with the systematic information bits.

18. The apparatus in claim 13, wherein when the systematic information bits are retransmitted, and a negative acknowledgment signal is received in response to the retransmission, parity bits associated with the systematic information bits are retransmitted over the communications channel to the receiver without the systematic information bits.

19. The apparatus in claim 13, wherein when a negative acknowledgment signal is received, the systematic information bits are retransmitted over the communications channel to the receiver along with parity bits.

20. The apparatus in claim 13, wherein when a negative acknowledgment signal is received, parity bits are transmitted over the communications channel to the receiver without the systematic information bits.

21. Apparatus for use in a receiver which receives data over a communications channel, comprising:

transceiving circuitry configured to receive a coded data packet transmitted over the communications channel by a transmitter, where an initially transmitted coded data packet includes a first type of bits corresponding to actual information bits and a second type of bits corresponding to parity bits, the information bits being more important to decoding than the parity bits; and packet processing circuitry configured to detect the absence of an expected packet and to transmit a lost signal message to the transmitter rather than a negative acknowledgement signal, the lost signal message indicating that the data packet was detected as absent, and thereafter, to decode a first retransmission of the expected packet which includes the information bits, wherein if decoding of the first retransmission is not successful, the packet processing circuitry is configured to send the negative acknowledgment signal to the transmitter, and in response, a second retransmission is received including a set of the parity bits without the information bits.

22. The apparatus in claim 21, wherein the packet processing circuitry includes:

a decoder for decoding a received data packet, and wherein if the data packet cannot be properly decoded, the lost signal message is sent to the transmitter.

23. The apparatus in claim 21, wherein the packet processing circuitry includes:

a buffer for storing received data packet information;

a combiner for combining buffer information with retransmitted information;

a decoder for decoding an output of the combiner; and a controller coupled to the buffer, combiner, and decoder.

24. The apparatus in claim 23, wherein the decoder is a turbo decoder.

25. The apparatus in claim 23, wherein the buffer and the combiner perform an incremental redundancy operation.

26. The apparatus in claim 23, wherein the decoder performs error correction and the packet processing circuitry further detects errors in the output of the decoder.

27. The apparatus in claim 23, wherein if the decoder output is not acceptable, the controller is configured to send the negative acknowledgment signal to the transmitter.

28. The apparatus in claim 21, wherein the first retransmission also includes a first set of the parity bits.

29. The apparatus in claim 21, wherein the second transmission is received including the information bits and the parity bits.

* * * * *